United States Patent [19]

Berger et al.

[11] Patent Number: 4,804,737
[45] Date of Patent: Feb. 14, 1989

[54] SILOXANES, THEIR SYNTHESIS AND USE AS DEAERATING AGENTS FOR CURABLE RESINS OF PLASTISOLS

[75] Inventors: Roland Berger, Bochum; Hans-Ferdi Fink; Otto Klocker, both of Essen, all of Fed. Rep. of Germany

[73] Assignee: Th. Goldschmidt AG, Essen, Fed. Rep. of Germany

[21] Appl. No.: 72,880

[22] Filed: Jul. 14, 1987

[30] Foreign Application Priority Data

Aug. 16, 1986 [DE] Fed. Rep. of Germany ....... 3627782

[51] Int. Cl.$^4$ .............................................. C08G 77/04
[52] U.S. Cl. ..................................... 528/26; 556/437; 556/446; 252/321; 252/356
[58] Field of Search ...................... 556/446, 462, 437; 528/26; 252/321, 356

[56] References Cited

U.S. PATENT DOCUMENTS

| | | | |
|---|---|---|---|
| 3,398,104 | 8/1968 | Haluska | 556/437 |
| 3,548,025 | 12/1970 | Koerner | 556/437 |
| 3,595,885 | 7/1971 | Rossmy et al. | 528/26 |
| 3,595,894 | 7/1971 | Brown et al. | 556/437 |
| 4,384,100 | 5/1983 | Takamizawa et al. | 556/402 |
| 4,408,031 | 10/1983 | Holtschmidt et al. | 528/26 |

Primary Examiner—Lewis T. Jacobs
Assistant Examiner—Ralph Dean, Jr.
Attorney, Agent, or Firm—Toren, McGeady & Associates

[57] ABSTRACT

Alkoxysiloxanes of the general formula

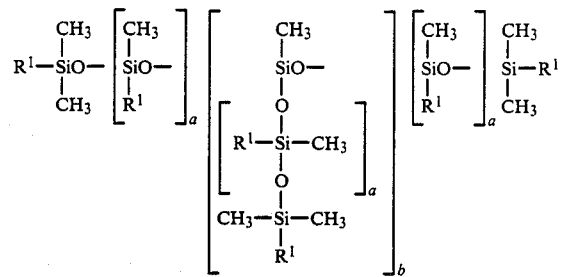

are disclosed wherein $R^1$ is methyl or

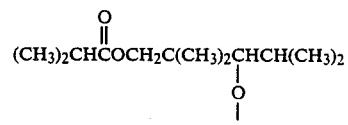

and/or

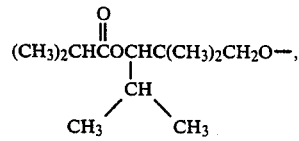

the sum of the units a being 0 to 100, the sum of the units b being 0 to 15, with the proviso that the ratio of methyl to alkoxy groups in $R^1$ is less than 50:1, and that $b \leq 1$ when $a=0$ and $a \leq 5$ when $b=0$.

The compounds may be synthesized by known methods from halogen- or alkoxysiloxanes, the alkoxy group of which has 1 to 4 carbon atoms. The compounds are effective deaerating agents for curable resins and plastisols. The invention is also directed to compositions containing the novel deaerating compounds as well as to methods for deaerating coating systems.

5 Claims, No Drawings

SILOXANES, THEIR SYNTHESIS AND USE AS DEAERATING AGENTS FOR CURABLE RESINS OF PLASTISOLS

FIELD OF INVENTION

The invention is directed to new polysiloxanes and methods for their synthesis and more particularly to polysiloxanes substituted with an oxy group derived from an isobutyric acid monoester of octanediol. Considered from another aspect, the invention is concerned with novel deaerating agents and compositions as well as a method for deaerating curable resins or plastisols which are solvent-free or which contain small amounts of solvent only (hereinafter "solvent-poor").

BACKGROUND INFORMATION AND PRIOR ART

During the coating of surfaces with curable resins or plastisols, as well as during the preparation of molded articles by pouring curable resins into molds and curing the resins in the molds, small gas bubbles, are frequently formed, which usually are finely dispersed in the organic phase. A portion of these bubbles floats to the surface of the lacquer or coating, bursts there and causes no disorders, as long as the flowability of the lacquer or plastisol film is still large enough to equalize or even out the disturbed surface by afterflow. Another portion of the bubbles rises to the surface, but does not burst there and, when the lacquer cures or the plastisols gels, forms a very thin surface skin which can easily be damaged mechanically. Other bubbles remain dispersed in the film or in the molded articles formed. Such disorders in a lacquer film are referred to as pinholes.

The phenomenon of this so-called microfoam is not to be compared with the behavior and appearance of a normal, more or less small-celled polyhedral foam. While the known defoamers or antifoamers destroy the partitions between the individual foam bubbles or prevent their stable formation, the individual, mostly spherical gas bubbles in microfoams of such water-dilutable coating systems are so far removed from one another, that no lamellae or partitions are formed between the individual spheres of foam. For this reason, the known antifoaming agents usually fail to eliminate and remove the microfoam. Such elimination or removal is also referred to as deaerating. Further references to the different behavior of spherical foam and polyhedral foam are given in "Ullmanns Encyclopädie der technischen Chemie" (Ullmann's Encyclopedia of Chemical Engineering) volume 20, pp. 441 ff.

It may be assumed that phenomena at the interface between the gas bubbles and the liquid affect the deaeration. Possibly, the deaeration is affected by changes in the viscosity of the coating system in the boundary surface to the gas bubbles. In any case, because of the different physical and/or chemical effects on the interfaces between the liquid and the gas, a person skilled in this art, knowing the effectiveness of antifoaming agents, is unable to draw reasonable conclusions concerning the effectiveness of so-called deaerating agents.

OBJECTS OF THE INVENTION

It is therefore an object of the invention to find new compounds and methods for their synthesis, which have a particularly high effectiveness as deaerating agents for coating systems. In terms of the invention, coating systems are understood to be those systems, which are essentially anhydrous and do not contain organic solvents and inert organic solvents, or contain such solvents only in subordinate amounts (solvent-poor). The coating systems may be built up on the basis of reaction coatings, as well as on the basis of plastisols. They may contain conventional additives such as pigments or fillers.

Examples of such curable resins (reaction coatings) are those based on epoxides, for which amines or amides may function as curing agents. Unsaturated polyester resins, which are polymerized by a free radical reaction in the presence of an unsaturated monomer such as styrene, are also suitable. As plastisols, generally those are used, which contain homopolymers or copolymers of polyvinyl chloride dispersed in a suitable plasticizer, such as dioctyl phthalate.

SUMMARY OF INVENTION

Surprisingly, it has been discovered that such curable resins and plastisols can be successfully deaerated by the addition of certain novel siloxanes.

The novel siloxanes are polysiloxanes substituted with an oxy group derived from an isobutyric acid monoester of octanediol have the general formula

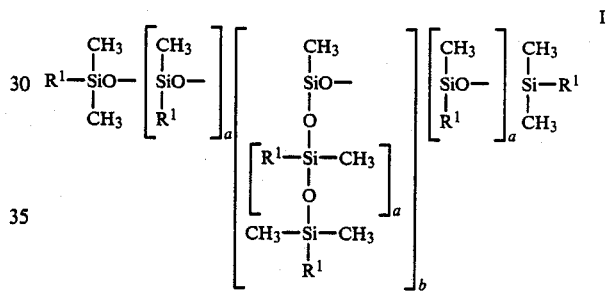

wherein $R^1$ is selected from the group consisting of (1) methyl,

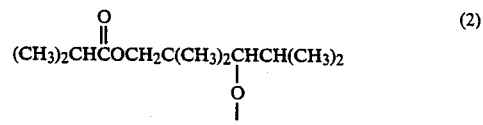

and

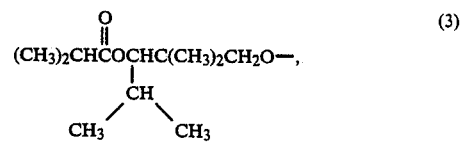

the sum of the units a being 0 to 100,
the sum of the units b being 0 to 15,
with the proviso that the ratio of methyl to groups (1) and (2) in $R^1$ is less than 50:1, and that $b \geq 1$ when $a=0$ and $a \geq 5$ when $b=0$.

The general formula I is an average formula. The compounds usually are present in the form of a mixture which, in relation to its molecular weight distribution and the arrangement of the siloxy units, corresponds to a statistical distribution or approximates such a distribution.

The R$^1$ group, which is linked to the siloxane framework, is of particular importance. This group, if in the form as shown, may be present in two sterically different forms, a mixture of both forms usually being present in the average molecule.

Groups (2) and (3) of R$^1$ are oxy groups derived from an isobutyric acid monoester of octanediol.

The subscript a refers to the number of difunctional siloxy units and thus to the length of the siloxane chain(s).

The subscript b refers to the number of trifunctional siloxy units. Since the alkoxypolysiloxanes of the invention may be present in the unbranched form, b may assume a value of 0.

Especially preferred are compounds, in which a has a value of 3 to 6 and b a value of 1 to 3. Moreover, especially those compounds are preferred, in which the sum of the values for a is 10 to 60, when b has a value of 0. Examples of such new compounds are

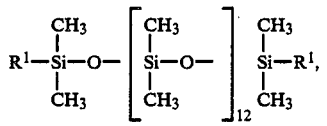

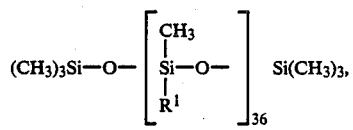

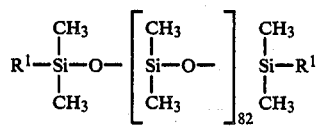

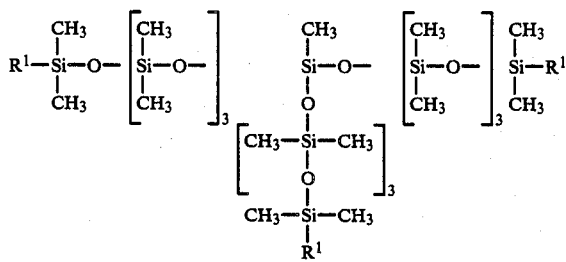

The novel siloxanes may be synthesized by known methods, similar to those used for known alkoxypolysiloxanes, by reacting siloxanes of the formula

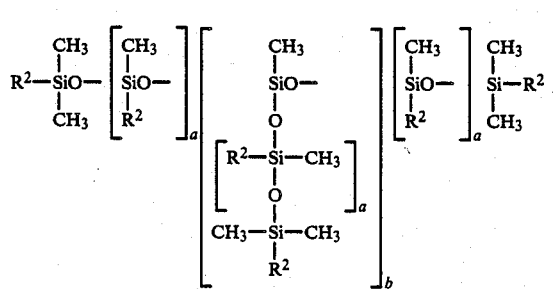

wherein R$^2$ is methyl, hydrogen, halogen or alkoxy with 1 to 4 carbon atoms and the ratio of methyl groups to the remaining groups is less than 50:1 and a and b have the above numerical values, in a known manner with, based on the hydrogen, halogen or alkoxy groups, at least equimolar amounts of alcohols of the formula

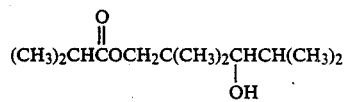

and/or

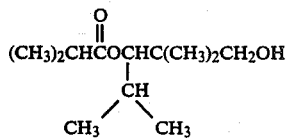

The reaction may be carried out at an elevated temperature and in the presence of catalysts.

If R$^2$ is halogen, chlorine is preferred. A portion of the chlorine groups may be replaced by equivalent amounts of sulfate groups. These halogensiloxanes of formula II are reacted with alcohols of formulas III and IV in the presence of basic compounds as acid traps, preferably ammonia. The reaction can take place in the presence of a solvent. Benzene or toluene are suitable as solvent. After the reaction, the precipitated halide, for example, ammonium chloride, is removed from the reaction mixture by filtration and the solvent is removed by distillation. Such a preparative method is described in U.S. Pat. No. 3,115,512.

If R$^2$ represents an alkoxy group with 1 to 4 carbon atoms, the alkoxysiloxanes of formula II are transesterified with alcohols of formulas III and IV. The exchange reaction is catalyzed by alkali hydroxides or by acids, such as trifluoroacetic acid. Such exchange reactions are described for chain alkoxysiloxanes in the German Pat. No. 1,012,602 and for branched siloxanes in the German Pat. No. 1,040,251. The methods, disclosed there, can be transferred directly to compounds of formula II.

R$^2$ may also be hydrogen. The reaction of siloxanes with SiH groups is known to those skilled in the art and is described, for example, in the "Journal of Organometallic Chemistry" 157 (1978), 153 to 162, in which the alcoholysis of SiH group-containing silanes is used as example.

Compounds of the general formula I show the desired high effectiveness as deaerating agent. They are added to the coating system in amounts of 0.05 to 1% by weight. The amount of the inventive compounds added depends on the nature of the coating system and especially on whether and in what amounts fillers are added to the coating system. The higher the addition of fillers, the higher is the amount of deaerating agent that must be added.

Compounds of formula I may be added to the coating systems as such or in dissolved form. Suitable as solvent for the inventive alkoxysiloxanes are aromatic hydrocarbons such as benzene or toluene, and esters and ethers such as ethyl glycol acetate, butyl glycol, as well as glycols such as propylene glycol. It is also possible to use alcohol of formulas III and IV as solvent.

The effectiveness of the inventive siloxanes of formula I can be increased even further by adding the compounds to the coating systems together with finely dispersed silica. The mixing ratio of compounds of formula I to finely dispersed silica should be 99:1 to 70:30 and preferably about 95:5. The finely dispersed silica is advantageously used in the known, hydrophobized form.

The synthesis of the novel compounds and the use of these compounds as deaerating agents are shown in greater detail in the following examples, it being understood that these examples are given by way of illustration and not by way of limitation.

EXAMPLE 1

In a 1 L 2-neck flask, 75.6 g of a mixture of the alcohols of Formulas III and IV (0.35 moles) are mixed with 350 g of toluene. For azeotropic drying, about 100 g of toluene are distilled off. Subsequently, 182.2 g of an α,ω-dichloropolysiloxane of the average chain length (2a+2=14 (0.166 mL)) are added dropwise at 75° to 80° C. The HCl formed during the reaction is expelled as far possible. When the postreaction is completed, the reaction mixture is neutralized at room temperature with 0.9 g if monomethylethanolamine in 13 g of ethanol and the reaction product is freed from solvent (yield: 239.9 g=96%).

Analysis: Cl less than 0.0190; OH: 0.13%

EXAMPLE 2

(a) Deaerating Agent Containing the Inventive Compounds

Siloxane of formula I (50 g), 45 g of butyl glycol and 5 g of hydrophobic, finely divided silica are mixed with a high-speed stirrer. The siloxanes used have the following subscripts.

|  | Numerical Value of | |
| --- | --- | --- |
|  | a | b |
| Siloxane 1 | 6 | 0 |
| Siloxane 2 | 10 | 0 |
| Siloxane 3 | 22 | 0 |
| Siloxane 4 | 37.5 | 0 |
| Siloxane 5 | 41 | 0 |
| Siloxane 6 | 5.2 | 2 |

(b) Deaerating Agents of the State of the Art

Comparison Product A=siloxane of the general formula

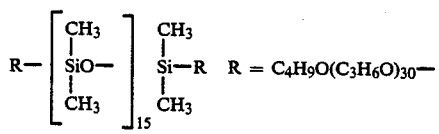

Commercially obtainable under the name of Tegopren 1484

Comparison Product B=1,4-polybutadiene, dissolved in organic solvents; commercially obtainable under the name of Byk A 500.

Comparison Product C=Polysiloxane, dissolved in organic solvents, containing trifluoropropyl groups and having a viscosity of 300 mPa×sec; commercially obtainable under the name of Byk A 505.

(c) Testing the Effectiveness of the Dearating Agent ($c_1$) Filler-Free Epoxide Resin In a stirred vessel, 125 g of an epoxide resin with an epoxide equivalent of 200 and a viscosity of 500 to 100 mPa (obtainable commercially under the name of Beckopox EP 128), 75 g of a modified cycloaliphatic polyamine as curing agent (obtainable commercially under the name of Euredur 43 S) and 2 g of the dearating agent to be tested are mixed for 5 minutes with a stirrer with disperser disk (having a diameter of 3 cm and a circumferential speed of 4 m/sec). In so doing, a considerable amount of air was dispersed into the mixture. This mixture is poured into molds with the dimensions of 40×75×5 mm, which previously had been coated with a release coating of polyvinyl alcohol and dried. After 24 hours, the cured castings were removed from the mold and the surface of the castings was examined for flow disorders. In addition, the castings were examined in transmitted light for air inclusions or impressions.

Irregular surfaces, which are caused by microbubbles that have not burst or by craters, which have not merged and have arisen from burst microbubbles, are as undesired by processors of such systems as is cloudiness of the resin, caused by the additive. The molded articles should be as free as possible of air bubbles embedded in the layer.

($c_2$)

In a stirred vessel, 146 g of quartz sand having a particle size greater than 0.5 mm are mixed, as described above, with 34 g of the aforementioned epoxide resin, 20 g of the aforementioned curing agent and 0.5 g of the deaerating agent to be tested and poured into molds. After removal from the mold, the surface of the panels is examined for flow disorders. The surface should be as free as possible of foam bubbles and craters.

(d) The Following Results Were Obtained in the Comparison Experiments ($d_1$) Filler free epoxide resins

TABLE 1

|  | State of the Panel | | |
| --- | --- | --- | --- |
|  | Surface | Cloudiness | Foam Bubbles in the Panel |
| Without Siloxane | very many bubbles and craters | could not be evaluated | very many |
| Siloxane 1 | smooth, bubble- and crater-free surface | none | isolated |
| Siloxane 2 | smooth, bubble- and crater-free surface | none | isolated |
| Siloxane 3 | smooth, bubble- and crater-free surface | none | none |
| Siloxane 4 | smooth, bubble- and crater-free surface | none | none |
| Siloxane 5 | smooth, bubble- and crater-free surface | none | none |
| Siloxane 6 | smooth, bubble- and crater-free surface | none | none |
| Comparison Product A | no craters | slight cloudiness | 28 microbubbles in the panel |
| Comparison Product B | isolated craters | clear | 21 microbubbles in the panel |

TABLE 1-continued

| | State of the Panel | | |
|---|---|---|---|
| | Surface | Cloudiness | Foam Bubbles in the Panel |
| Comparison Product C | isolated craters | clear | isolated microbubbles in the panel |

($d_2$) Filler-Containing Epoxide Resin

TABLE 2

| | State of the Test Panels |
|---|---|
| Without Siloxane | Surface densely covered with bubbles, some bubble diameter up to about 1 mm, 2-3 mm craters |
| Siloxane 1 | 5 microbubbles (with a diameter of 0.5 mm), otherwise glossy, smooth surface |
| Siloxane 2 | bubble-free, smooth, glossy surface |
| Siloxane 3 | bubble-free, smooth, glossy surface |
| Siloxane 4 | bubble-free, smooth, glossy surface |
| Siloxane 5 | bubble-free, smooth, glossy surface |
| Siloxane 6 | bubble-free, smooth, glossy surface |
| Comparison Product A | 25 microbubbles and 4 craters at the surface, otherwise a smooth surface |
| Comparison Product B | 18 microbubbles and 5 craters, otherwise smooth surface |
| Comparison Product C | 14 microbubbles and 2 craters, surface not as glossy as with A 500 |

EXAMPLE 3

Deaerating a Plastisol

A paste consisting of 70 g of polyvinyl chloride and 30 g of dioctyl phthalate is weighed into a graduated beaker, which is provided with cm divisions. The beaker is then placed in a vacuum desiccator, which is evacuated rapidly with the help of a pump to 20 mbar and left at this pressure. After 1, 2 and 3 minutes, the height of the foam, formed by the air escaping from the paste, is measured (1st measurement). After 3 minutes, air is allowed to flow into the desiccator one again. The desiccator is then evacuated once more, the height of the foam measured at the specified times and the pressure equalized (2nd measurement). The experiment is carried out without deaerating agent and with the addition of 0.5% by weight of the inventive siloxane 6. The following results are obtained:

TABLE 3

| | Foam Height in cm After | | | | | |
|---|---|---|---|---|---|---|
| | 1st Measurement [min] | | | 2nd Measurement [min] | | |
| | 1 | 2 | 3 | 1 | 2 | 3 |
| Without Silicone | 8 | 8 | 8 | 5 | 0.6 | 0.6 |
| With Inventive Siloxane 6 | 2 | 0.5 | 0.5 | 0.4 | 0.4 | 0.4 |

I claim:

1. Compounds of the general formula

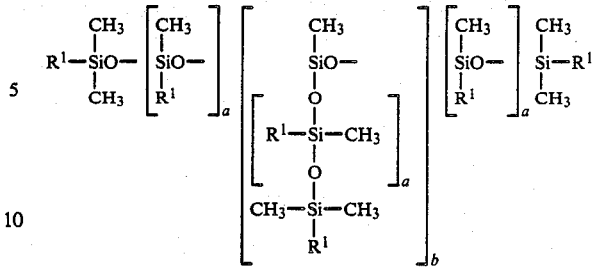

wherein $R^1$ is selected from the group consisting of
(1) methyl,

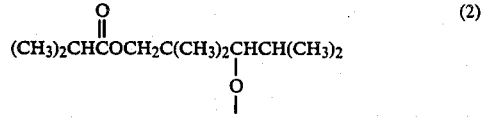

and

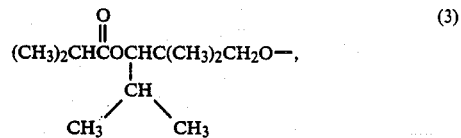

the sum of the units a being 0 to 100,
the sum of the units b being 0 to 15,
with the proviso that the ratio of methyl (1) to groups (2) and (3) in $R^1$ is less than 50:1, and that $b \geq 1$ when $a=0$ and $a \geq 5$ when $b=0$.

2. The compounds of claim 1, wherein $a=3$ to 6 and $b=1-3$.

3. The compounds of claim 1, wherein the sum of the values for a is between 10 to 60 when b has a value of 0.

4. Compounds of claim 1, wherein the compounds are members selected from the group consisting of

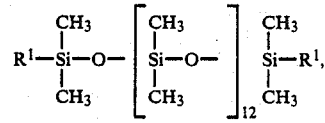

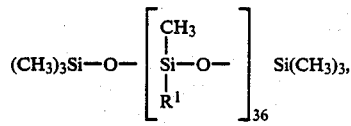

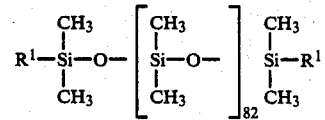

and

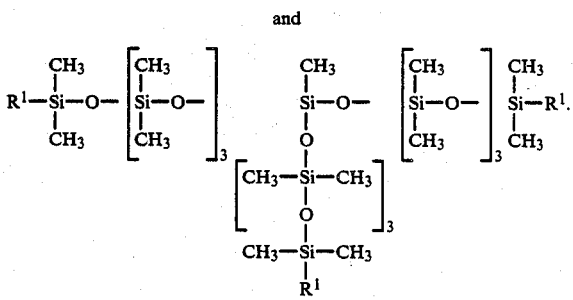

5. A deaerating agent essentially consisting of a compound of claim 1.

* * * * *